United States Patent

Schneider et al.

(10) Patent No.: US 9,542,660 B2
(45) Date of Patent: Jan. 10, 2017

(54) WORK PROCESS COLLABORATION MANAGEMENT

(71) Applicant: Mitchell International, Inc., San Diego, CA (US)

(72) Inventors: Craig A. Schneider, San Diego, CA (US); Stefanos Makris, San Diego, CA (US); Frederick Albert, San Diego, CA (US); Niv Genchel, San Diego, CA (US); John Fletcher, San Diego, CA (US); Juveria Kanodia, San Diego, CA (US); Kshitij Deshmukh, San Diego, CA (US)

(73) Assignee: MITCHELL INTERNATIONAL, INC., San Diego, CA (US)

( * ) Notice: Subject to any disclaimer, the term of this patent is extended or adjusted under 35 U.S.C. 154(b) by 307 days.

(21) Appl. No.: 13/831,330

(22) Filed: Mar. 14, 2013

(65) Prior Publication Data

US 2014/0129642 A1 May 8, 2014

Related U.S. Application Data

(60) Provisional application No. 61/722,072, filed on Nov. 2, 2012.

(51) Int. Cl.
G06F 15/16 (2006.01)
G06Q 10/06 (2012.01)

(52) U.S. Cl.
CPC .................................... *G06Q 10/06* (2013.01)

(58) Field of Classification Search
CPC G06F 17/2288; G06F 17/30309; H04L 12/24; H04L 47/10; H04L 12/1827; G06Q 10/06; C07H 19/14

USPC .......................................... 709/205, 227, 228
See application file for complete search history.

(56) References Cited

U.S. PATENT DOCUMENTS

| | | |
|---|---|---|
| 5,737,727 A | 4/1998 | Lehmann et al. |
| 6,349,238 B1 | 2/2002 | Gabbita et al. |
| 6,505,219 B1 | 1/2003 | MacLean et al. |
| 7,499,951 B2 | 3/2009 | Mueller et al. |
| 7,702,736 B2 | 4/2010 | Ouchi |
| 7,885,847 B2 * | 2/2011 | Wodtke et al. ............. 705/7.26 |
| 8,131,668 B2 | 3/2012 | Beringer et al. |

(Continued)

OTHER PUBLICATIONS

W. Keith Edwards, Session management for collaborative applications, 1994, CSCW '94 Proceedings of the 1994 ACM conference on Computer supported, ACM, pp. 323-330.*

(Continued)

*Primary Examiner* — Tonia L Dollinger
*Assistant Examiner* — Dixon Dabipi
(74) *Attorney, Agent, or Firm* — Kilpatrick Townsend & Stockton LLP

(57) ABSTRACT

A collaboration message is received at a computer system network node of a computer network that operates in a decentralized arrangement such that network nodes comprise work process sources and destinations, and the collaboration messages convey process state updates among the collaborators. There is no central authority though which all process messages and state updates must pass and which thereby may create a system bottleneck and limit system growth. The computer system is scalable and system operation remains efficient with increasing numbers of network nodes.

10 Claims, 6 Drawing Sheets

(56) References Cited

U.S. PATENT DOCUMENTS

| | | | |
|---|---|---|---|
| 8,180,668 B2* | 5/2012 | Wargin et al. | 705/14.26 |
| 8,522,240 B1* | 8/2013 | Merwarth et al. | 718/100 |
| 2003/0009603 A1* | 1/2003 | Ruths et al. | 709/318 |
| 2008/0313281 A1* | 12/2008 | Scheidl et al. | 709/205 |
| 2012/0025955 A1 | 2/2012 | Balfour et al. | |
| 2012/0233617 A1* | 9/2012 | Onno | 718/100 |

OTHER PUBLICATIONS

James Allen, Nathanael Chambers‡, George Ferguson†, Lucian Galescu, Hyuckchul Jung, Mary Swift†, William Taysom, PLOW: A Collaborative Task Learning Agent, 2007, aaai.org, pp. 1514-1519.*

Gal A. Kaminka, Ari Yakir, Dan Erusalimchik, Nirom Cohen-Nov, Towards collaborative task and team maintenance, 2007, AAMAS, '07 Proceedings of the 6th international joint conference on Autonomous agents and multiagent systems, pp. 476-483.*

* cited by examiner

WORK PROCESS COLLABORATION MANAGEMENT

CROSS-REFERENCE TO RELATED APPLICATIONS

This application claims priority to U.S. Provisional Application No. 61/722,072 filed Nov. 2, 2012 and entitled "Work Process Collaboration Management", which is incorporated herein by reference in its entirety.

BACKGROUND

The management of work projects, group efforts, and the like has resulted in the development of computer-based support systems typically referred to as process management systems. Such systems typically support computer network communications between a central authority computer system and multiple users at respective computer workstations. Work projects, also referred to as processes, are created and managed by the central authority, which controls the state of the project and manages the communications, maintains project management information, and ensures proper messaging among the multiple users who are working on the projects. The users update the central authority as they complete project tasks, so the central authority can maintain data about the project status and can rollout the current project status to the other users. To maintain the data and provide the project management, all network communications and status changes regarding the project are typically channeled through the central authority.

Utilizing a central authority concentrates management tasks at a single point and can simplify the system design and operation. Such centralization, however, can lead to processing bottlenecks as the central authority can be subject to a heavy workload as users update their work on projects, and can increase complication for dealing with users who alternately come online to the network and go offline, while the central authority attempts to update project status. Such systems also may have difficulty in keeping up with an expanded base of users, as more workstations are added to the system.

Techniques for greater efficiency, scalability with expanding user bases, and flexibility for improved process management are needed. Disclosed herein are techniques to provide such improved process support.

SUMMARY

In accordance with the present invention, a collaboration message is received at a computer system network node of a computer network that operates in a decentralized arrangement such that network nodes comprise work process sources and destinations, and the collaboration messages convey process state updates among the collaborators. Thus, there is no central authority though which all process messages and state updates must pass and which thereby may create a system bottleneck and limit system growth. The computer system is scalable and system operation remains efficient with increasing numbers of network nodes.

The collaboration messages comprise work process instances that include process instance data that defines a work process instance and that includes an engagement identifier (ID), a public index, a private index, a work process state, and instance parameters that define one or more source collaborators, destination collaborators, and process owner collaborators, wherein the collaborators comprise network nodes. The network node verifies the instance parameters and a version number of the process instance data, and obtains corrected data from a work process engine in response to determining that any one of the instance parameters or version number cannot be verified, such that the instance parameters and version number are verified to be correct. The network node stores the process instance data and verifies instance parameters and version number at the network node, then updates the work process state in response to process instance data that indicates the collaboration message was received from a defined source collaborator or destination collaborator and indicates the work process state has been changed. The network node generates a collaboration message having process instance data that indicates a work activity specified in the instance parameters has been performed and changing the work process state accordingly and sends the generated collaboration message from the network node to the source collaborators, destination collaborators, and process owner collaborators of the defined work process instance.

Other features and advantages of the present invention will be apparent from the following description of the embodiments, which illustrate, by way of example, the principles of the invention.

Additional details of the illustrated embodiments are provided by the attached appendices, the contents of which are incorporated herein. The appendices comprise Appendix A, a High-Level Design document for "Platform Collaboration Framework" by Mitchell International, Inc., the assignee of the present invention, and Appendix B, a High-Level Design document for "Work Process Platform Service" by Mitchell International, Inc., the assignee of the present invention. While these documents relate to a vehicle collision claims processing platform, it should be understood that the vehicle collision claims processing platform represents only one example of the uses to which the disclosed invention may be applied, and the invention is not to be so limited.

DETAILED DESCRIPTION

Figure 1:
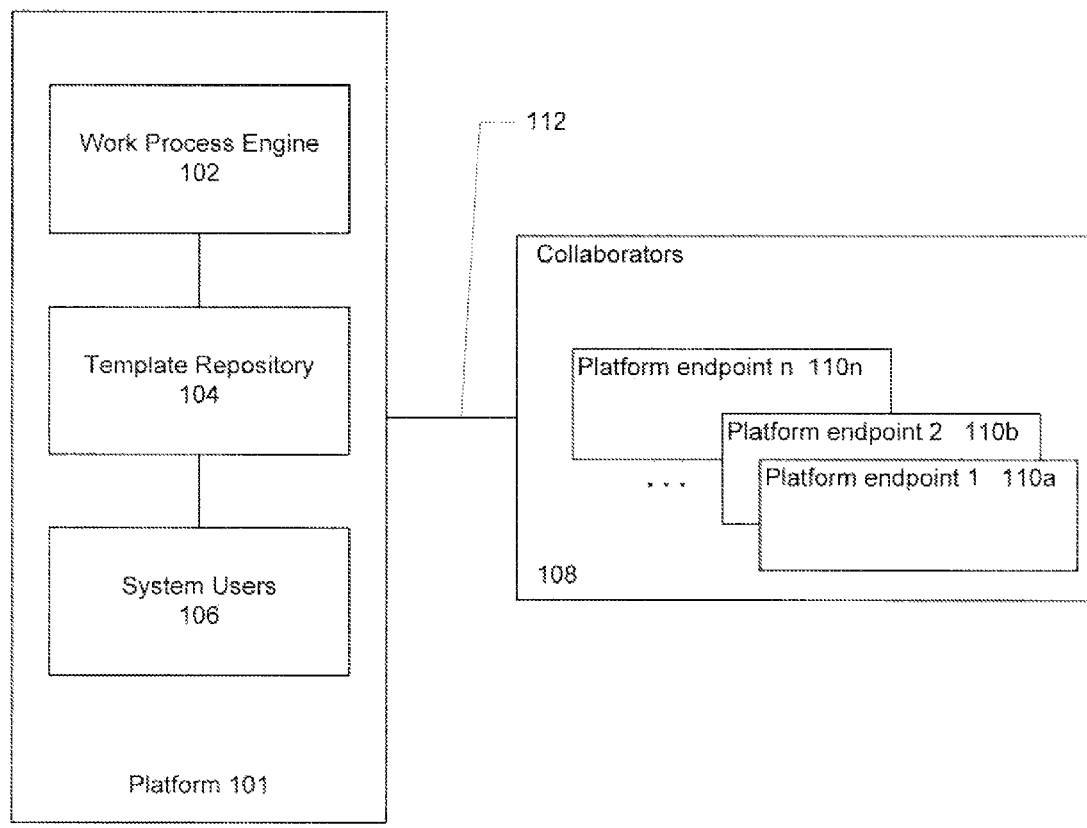
FIG. 1 is a block diagram representation of the work process collaboration management system as described herein.
Figure 2:
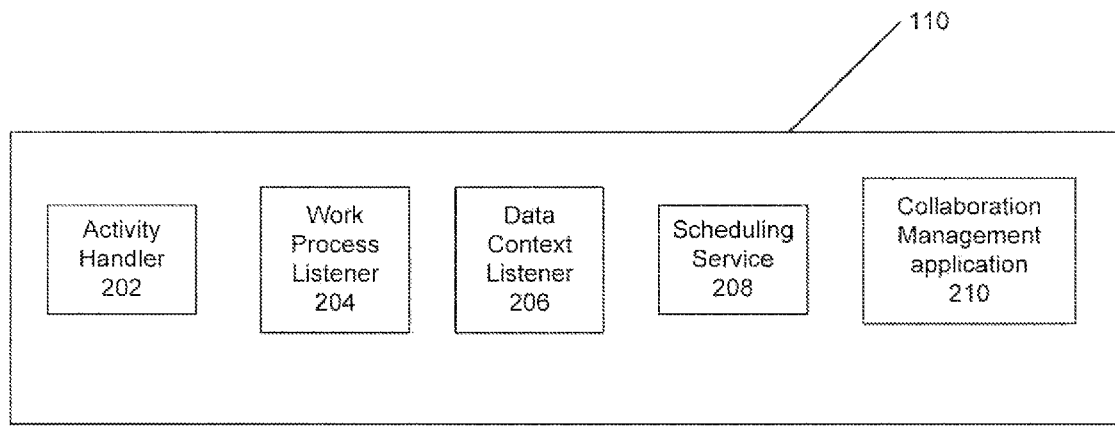
FIG. 2 is a block diagram representation of applications installed at each of the platform endpoints illustrated in FIG. 1.

FIG. 1 is a block diagram representation of the work process collaboration management system as described herein. The system includes a process platform 101 that includes a work process engine 102, a template repository 104, and system users 106. The process platform is utilized by users who are external to the platform 101 and are generally referred to as collaborators 108. The collaborators comprise multiple computer workstations, each of which comprises a platform endpoint that performs the actions described herein. FIG. 1 illustrates the multiple computer workstations as platform endpoints designated 110a, 110b, . . . , 110n, wherein the letter suffixes a, b, . . . , n indicate an indeterminate number of workstations that communicate with the platform. Thus, the implementation of the platform 101 is scalable as needed. The system users 106 also operate as collaborators, in that the system users can perform the tasks and functions that are performed by the external users/collaborators 108. The workstations will be referred to collectively as the platform endpoints 110, without a letter suffix. The collaborators 108 communicate with the components 102, 104, 106 of the platform 101 over a network 112. The network may comprise, for example, the Internet, or a private computer network, or any combination of interconnected computer systems capable of performing the operations disclosed herein FIG. 2 is a block diagram representation of components installed at each of the platform endpoints 110 illustrated in FIG. 1. The installed components include an activity handler 202, a work process listener 204, a data context listener 206, a scheduling service 208, and a collaboration management application 210. A work process as managed by the system of FIG. 1 is comprised of a sequence of work tasks, each of which is performed by one or more of the collaborators 108 of FIG. 1. The activity handler 202 is a process executing at a platform endpoint that assists the platform endpoint in providing a user interface with which a user at the platform endpoint may indicate the completion of activities specified by the work process. The work process listener 204 and data context listener 206 assist the platform endpoint with receiving and processing collaboration messages of the work process. In particular, the work process listener processes notifications received from the network 112, including other collaborators, and prepares outgoing messages and calls. The data context listener 206 processes information of the work process instance and determines and stores, at the platform endpoint host computer, data related to the work process. The scheduling service 208 sets response schedules, timers, and the like according to information in a work process instance. The collaboration management application 210 comprises an application that is installed at each endpoint and comprises executable computer software instructions that, when executed by the host computer endpoint, will provide the functionality described herein. For example, the activity handler 202, work process listener 204, and data context listener 206 may be implemented as dynamic link libraries (DLLs) that are stored at the local platform endpoint host computer and are registered with the collaboration management application 210.

Each collaboration management application maintains a message queue that receives, processes, and sends collaboration messages to the collaborators of the system. Each collaboration message includes process instance data that defines a work process instance and that includes an engagement identifier (ID), a public index, a private index, a work process state, and instance parameters that define one or more source collaborators, destination collaborators, and process owner collaborators. The collaboration message includes data that indicates a current work process version number, also called a status vector value. The vector value is a logical value (i.e., integer number) that associated with an activity that is logged at a collaborator as completed or performed, such that the logging of the completion of the activity initiates a vector value increment. Thus, the current state of an activity associated with a work process is indicated by the current vector value.

The system illustrated in FIG. 1 supports two types of system operation: definition tune, during which an authorized system user 106 may define work process templates and store them into the template repository 104, and runtime, during which an authorized user 106 or a collaborator 110 may select a work process template from the template repository and initiate the creation of as work process from the selected template. The two types of system operation, definition time and runtime, occur independently of each other. That is, authorized users may create work process templates while authorized users and collaborators select templates and work with them.

Figure 3:
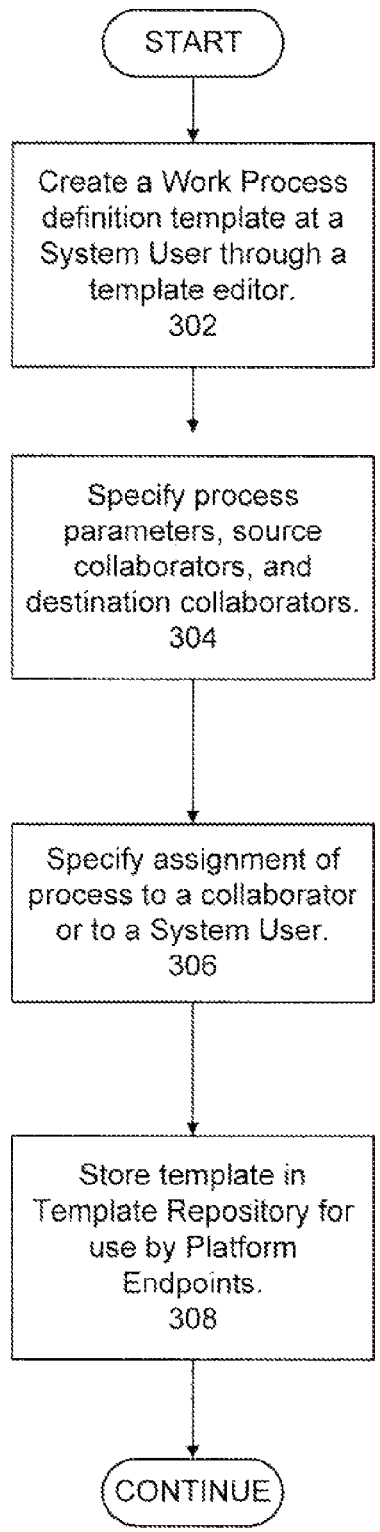
FIG. 3 is a flowchart representation of operations performed in the FIG. 1 system for creating a Work Process at definition time.

FIG. 3 is a flowchart representation of operations performed in the FIG. 1 system for creating a work process template at definition time. FIG. 3 shows that the first definition operation, at box 302, is to create a work process definition template at a system user 106 through a template editor. That is, only authorized system users 106 may create and save \volt process templates. The work process platform 101 is typically hosted by a proprietary entity, such as a project management company or work process hosting service or other service processor or provider. The system users will typically be specially authorized persons, such as employees of the hosting service or management company.

In the next definition operation, corresponding to box 304 of FIG. 3, the user specifies process parameters, source collaborators, and destination collaborators. The process parameters are parameters that will be needed by the work process of the template. The parameters may include, for example, document forms, data formats, requirements, and the like. The participants in moving the work process to completion may include collaborators who are sources of information and/or activity actions, and may include sources who are destinations of information and/or activities. The process parameters will also specified activities that comprise the work process, so that completing each of the activities will result in successful completion of the work process.

After the work process parameters and source and destination collaborators are identified, the next definition operation is to specify the assignment of the process to a work process owner, who is a collaborator 108 or a system user 106. That is, a work process will generally be assigned an "owner" who has particular obligations or duties associated with ensuring completion of the work process.

After the work process parameters have been set, the next template definition operation is to store the work process template in the Template Repository for use by platform endpoints. This operation is indicated by the FIG. 3 box numbered 308. Storing the template includes providing a work process template name, as noted further below. After storing the template, further system operations may continue; the work process template is now ready for selection and use.

Figure 4:
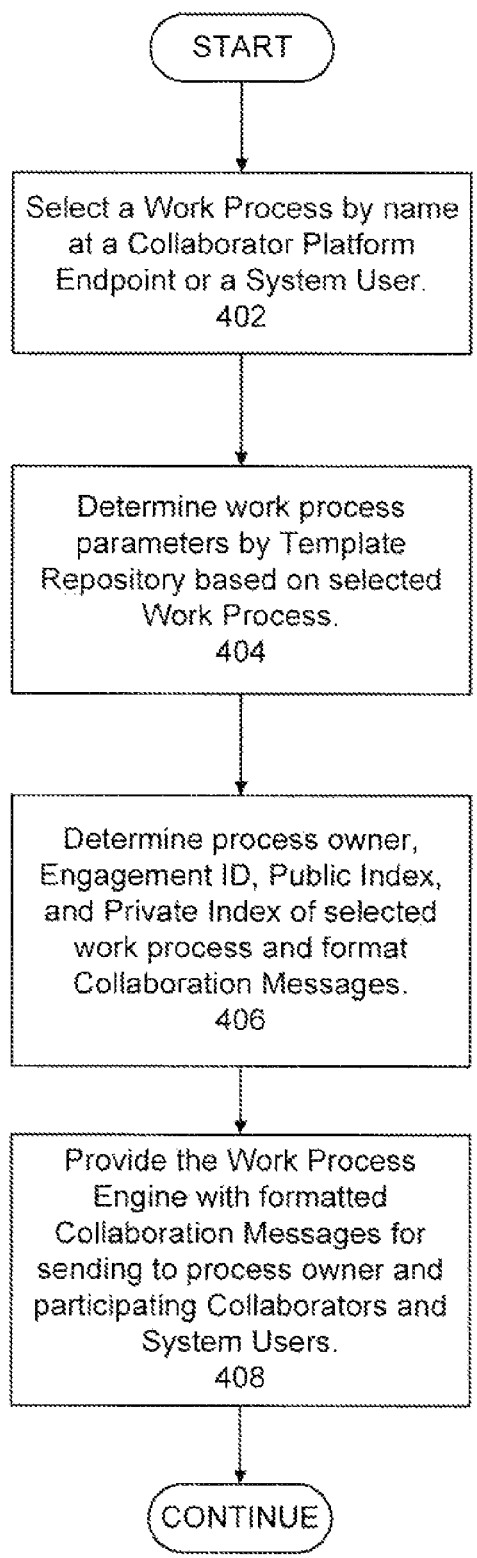
FIG. 4 is a flowchart representation of operations performed in the FIG. 1 system for instantiating a Work Process at run time.

FIG. 4 is a flowchart representation of operations performed in the FIG. 1 system for instantiating a Work Process at run time. That is, after the templates have been defined as in FIG. 3, a user interface is provided through which one of the templates may be selected by a collaborator for instantiation. The template repository 104 may be accessed through an online interface that may be accessed over the network 112. For example, the repository may be accessed, after suitable authentication and authorization, through a Web browser or other network application that provides a suitable user interface through which a template may be selected and edited.

In the first work process runtime operation, indicated by the first box 402 of FIG. 4, a previously defined work process template is selected at a collaborator platform endpoint 110 or a system user 106. The selection may be according to name, such as by text input in a dialog box, or by selection front a drop-down list of names, or by browsing in a window list, or other selection mechanism whereby a previously defined and named work process template may be selected. By supporting template selection by name, the system platform 101 makes operation easier for the users at platform endpoints 110 and simplifies identification and selection of appropriate work process templates for performance of desired tasks. The template selection is received at the template repository. The selection of a template can occur at any collaborator (platform endpoint) who obtains authorized access to the platform 101 and repository 104, and uses the repository interface to identify and select a work instance template that is appropriate to perform their desired action or process.

After the work process template has been selected, the next operation at box 404 is to determine the work process parameters. The work process parameters are determined by the template repository 104 based on the selected work process. That is, different work processes will require different work process parameters, and the repository will determine the work process parameters needed based on the selected template. In this way, the interface generated by the repository, to collect user inputs for setting the parameters, will, be properly configured. As part of the box 404 operation, the repository generates prompts or input screens to the user so that the user is prompted to provide appropriate input for proper operation of the selected work process.

After the user has provided input at box 404, the next runtime operation at box 406 is for the repository to utilize the template and user-provided information to determine work process parameters such as the process owner, an Engagement ID, a public index value, and a private index value for the selected work process. Based on such data, the repository formats a collaboration message and determines and identifies recipients for the collaboration message. Thus, the process instance data may include data for the engagement ID, public index, private index, work process state, and instance parameters that define one or more source collaborators, destination collaborators, and process owner collaborator.

Once the repository 104 formats the collaboration message, the next operation at box 408 is for the repository to provide the work process engine 102 with the formatted collaboration message for sending to the identified process owner and participating collaborators 108 and system users 106. Not all of the collaborators who are nodes of the network 112 will be recipients. Only network nodes identified in the work process instance will comprise participating collaborators, who will receive a collaboration message with the work process information. Likewise, not all of the system users will comprise network nodes who are identified in the work process instance, but all identified participating system users will receive a copy of the collaboration message. In this way, the collaboration message for the selected work process that is sent serves to instantiate the selected work process based on the work process template and user input.

Figure 5:
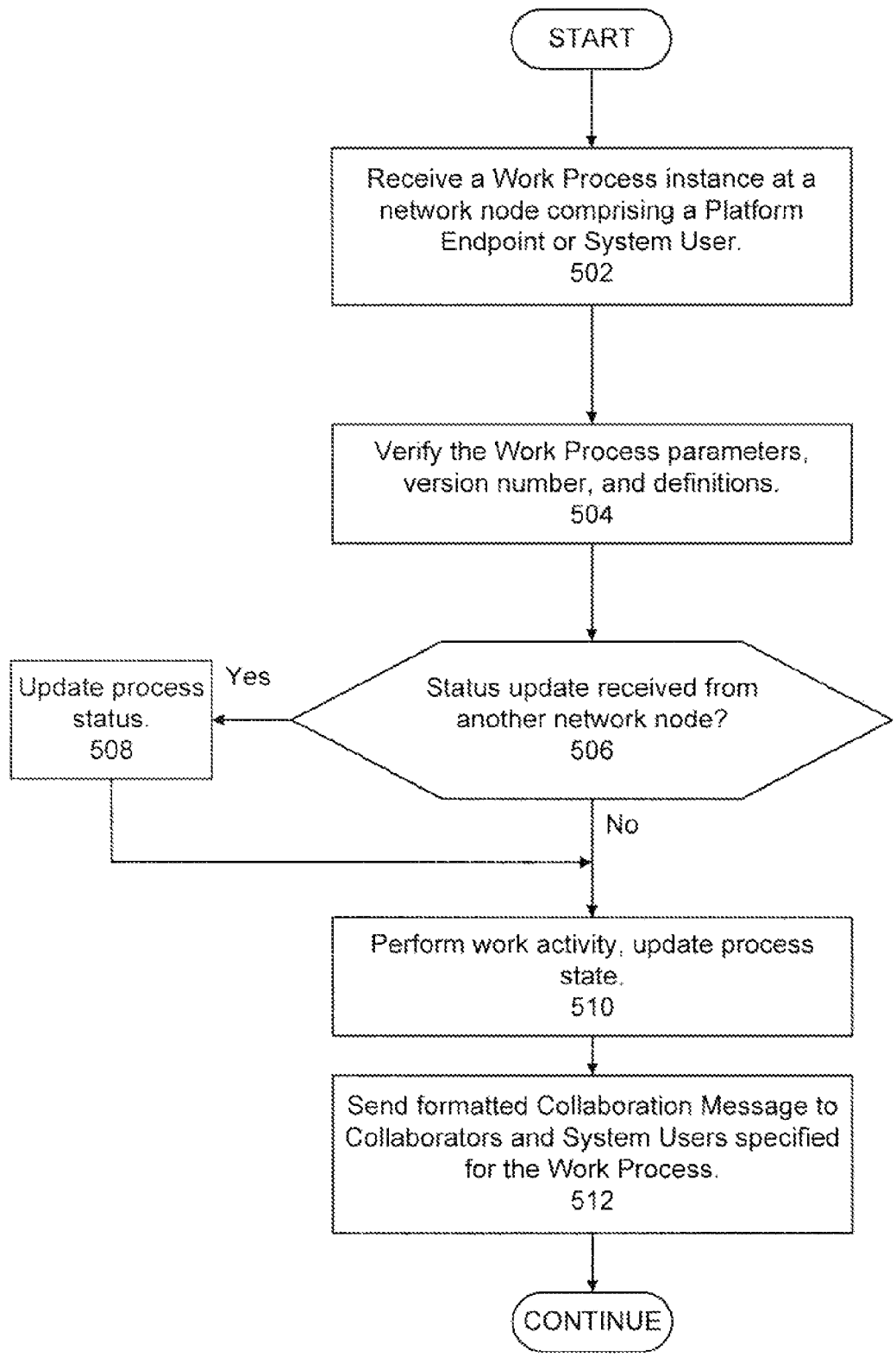
FIG. 5 is a flowchart representation of operations performed in the FIG. 1 system for an instantiated Work Process at run time.

FIG. 5 is a flowchart representation of operations performed in the FIG. 1 system for processing an instantiated Work Process at run time. The collaborators 108 (platform endpoints) and system users 106 will receive collaboration messages while they are operating. Some of those collaboration messages will contain data for starting a work process instance at the receiving, network node, where the receiving network node may be a system user 104 or a platform endpoint 110.

In the first collaboration processing operation, at box 502 of FIG. 5, the collaboration message is received at a network node comprising either a system user or a platform endpoint. The collaboration message includes process instance data that defines the work process instance, and that includes an engagement identifier (ID), a public index, a private index, a work process state, and instance parameters that define one or more source collaborators, destination collaborators, and process owner collaborators. As noted, the work process collaborators, or participants, are network nodes that may comprise platform endpoints 110 or system users 106.

After the collaboration message is received at box 502, the next operation, at box 504, is for the receiving network node to verify the work process parameters, version number, and definitions contained in the work process instance data of the collaboration message. In the case of an initial collaboration message received from the work process engine 102, the work process instance data may generally be accepted as valid. Once verified, the data is stored at the network node. On subsequently received collaboration messages, the work process instance data of the message may be subject to verification subject to previously stored work process data stored at the network node. Verification may comprise, for example, comparing the version number in the subsequently received collaboration message to an expected version number or the like based on the work process data stored at the network node. Verifying the instance parameters and version number of the process instance data may include obtaining corrected data from the work process engine in response to determining that any one of the instance parameters or version number cannot be verified, such that the instance parameters and version number are verified to be correct.

During runtime operation, a network node may receive a collaboration message that includes a status update or other change. This may occur, for example, when a participating collaborator performs a task of the work process, and sends the notification of completion as a status update to the other participating collaborators. The box 506 operation represents such processing, where the receiving collaborator (a network node) determines if the received collaboration message included a change to the work process state. If the collaboration message did include a work process state change, an affirmative outcome at box 506, then processing continues at box 508, where the network node updates the state of the work process by updating the work process data stored at the network node. Thus, the updating of the work process state is performed in response to process instance data that indicates the collaboration message was received from a defined source collaborator or destination collaborator and indicates the work process state has been changed. Processing then continues at box 510. If the collaboration message did not include a state change, a negative outcome at box 506, then processing continues at box 510.

The work process instance data in a collaboration message may include additional data other than process state. For example, updating the work process instance data at box 508 may include changing at least one of the process instance data comprising engagement ID, public index, or private index in response to data in the received collaboration message. With such changes, further operation may include verifying that the collaboration message was received from a defined source collaborator or destination collaborator of the work process, followed by storing the verified changed process instance data at the network node.

At box 510, an activity assigned to the collaborator of the work process is completed, and the work process data, including the work process state, that is stored at the network node is updated. The activity may comprise, for example, completing a form, finishing a service, providing an estimate or a product, or the like. The network node, via an activity handler application installed at the network node, will update the work process instance data stored at the network node. The activity handler application will also generate a properly formatted collaboration message, with the updated work process instance data including state, for sending to the other participating collaborators. Thus, the operation of box 510 includes generating a collaboration message at the network node, the collaboration message having process instance data that indicates a work activity specified in the instance parameters has been performed and changing the work process state accordingly.

At the next operation, indicated by box 512, the network node sends the generated collaboration message to participating work process collaborators, comprising platform endpoints 110 and system users 106.

Exemplary Hardware System

The systems and methods described above may be implemented in a number of ways. One such implementation includes computer devices having various electronic components. For example, components of the system in FIG. 1 may, individually or collectively, be implemented with devices having one or more Application Specific Integrated Circuits (ASICs) adapted to perform some or all of the applicable functions in hardware. Alternatively, the functions may be performed by one or more other processing units (or cores), on one or more integrated circuits or processors in programmed computers. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific computer processors.

Figure 6:
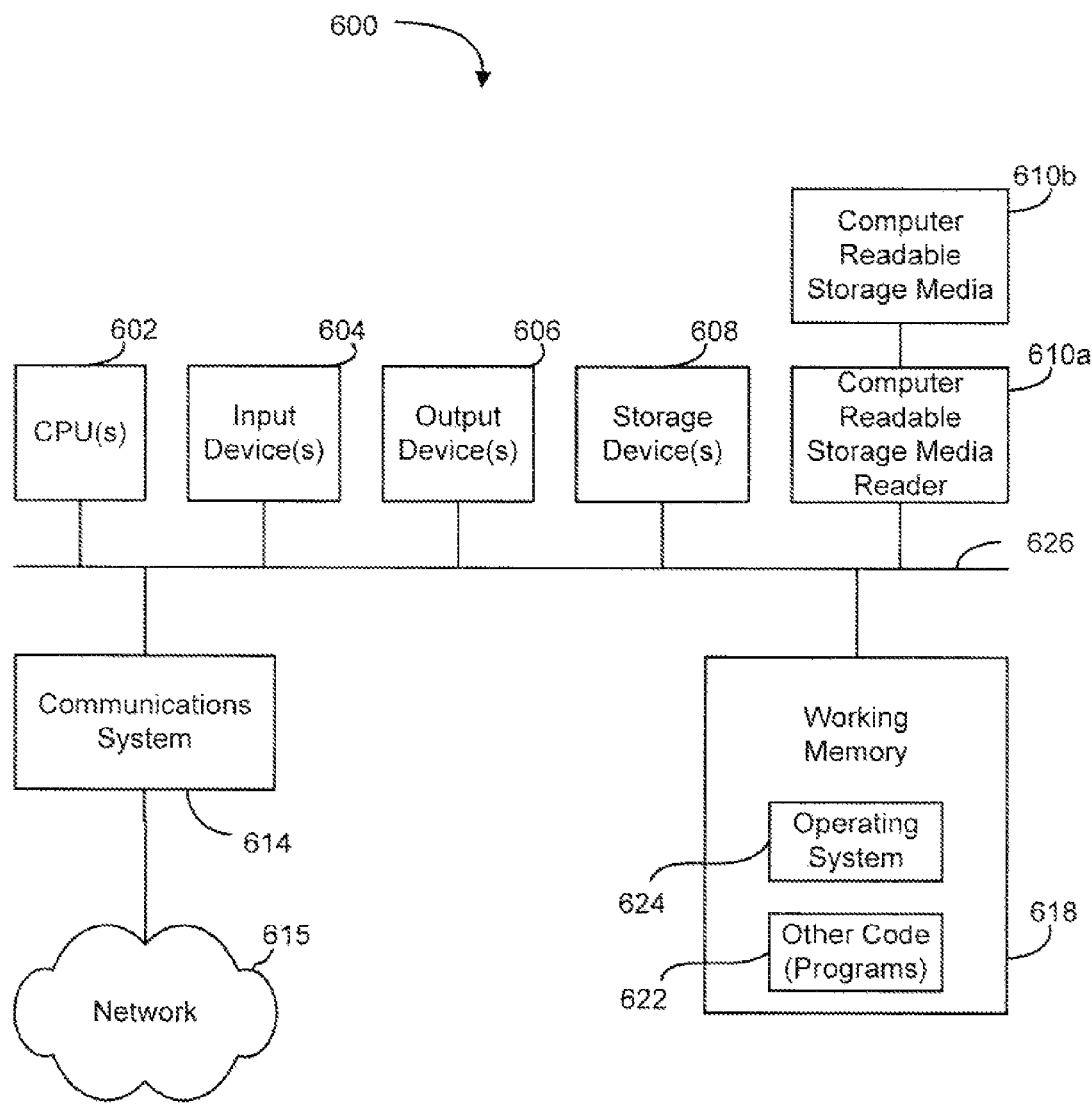
FIG. 6 is a schematic diagram representation of a computer system for implementing the functions and operations as described herein.

FIG. 6 provides a block diagram of a computer system 600 for implementing certain functions and operations as described herein. The computer system 600 may implement, for example, any one or all of the work process engine 102, template repository 104, system user 106, and platform endpoints 110 illustrated in FIG. 1. It should be noted that FIG. 6 is meant only to provide a generalized illustration of various components, any or all of which may be utilized as appropriate. FIG. 6, therefore, broadly illustrates how individual system elements may be implemented in a relatively separated or relatively more integrated manner.

The system 600 is shown comprising hardware elements that can be electrically coupled via a system bus 626 (or may otherwise be in communication, as appropriate). The hardware elements can include one or more central processor units (CPUs) 602, including without limitation one or more general-purpose processors and/or one or more special-purpose processors such as communication processing chips, graphics acceleration chips, and/or the like); one or more input devices 604, that can include, without limitation, a mouse, a keyboard, and/or the like; and one or more output devices 606, which can include without limitation a display device, a printer, audio device, and/or the like.

The computational system 600 may further include (and/or be in communication with) one or more storage devices 608, which can comprise, without limitation, local and/or network accessible storage and/or can include, without limitation, a disk drive, a drive array, an optical storage device, solid-state storage device such as a random access memory ("RAM"), and/or a read-only memory ("ROM"), which can be programmable, flash-updateable, and/or the like. The computational system 600 might also include a communications subsystem 614, which can include without limitation a modem, a network card (wireless or wired), an infra-red communication device, a wireless communication device and/or chipset (such as Bluetooth device, an 802.11 device, a WiFi device, a WiMax device, cellular communication facilities, etc.), and/or the like. The communications subsystem 614 may permit data to be exchanged with a network 615, and/or any other devices described herein. The network 615 may comprise a local area network (LAN) or a network such as the Internet, or a combination, in many embodiments, the computational system 600 will further include a working memory 618, which can include a RAM or ROM device, as described above.

The computational system 600 also may comprise software elements, shown as being currently located within the working memory 618, including an operating system 624 and/or other code, such as one or more application programs 622, which may comprise computer programs performing tasks and operations described above, and/or may be designed to implement methods in accordance with the invention and/or configure systems in accordance with the invention, as described herein. Merely by way of example, one or more procedures described with respect to the method(s) discussed above might be implemented as code and/or instructions executable by a computer (and/or a processor within a computer). In one embodiment, the data generating and presenting operations are implemented as application programs 622. In the description herein, references to "interface" and "processor" and "application" should be understood as referring to hardware, software, and combinations of the two, either as independent components (hardware, software, and/or both) for each interface, processor, or application, or as integrated components combined with one or more other components.

A set of these instructions and/or code may be stored on a computer readable storage medium 610*b*. In some embodiments, the computer readable storage medium 610*b* may comprise the storage device(s) 608 described above. In other embodiments, the computer readable storage medium 610*b* might be incorporated within the computer system. In still other embodiments, the computer readable storage medium 610*b* might be separate from the computer system (i.e. it may be a removable readable medium, such as a compact disc, etc.), and or might be provided in an installation package, such that the storage medium can be used to program a general purpose computer with the instructions/code stored thereon. These instructions might take the form of executable code, which is executable by the computational system 600 and/or might take the form of source and/or installable code, which, upon compilation and/or installation on the computational system 600 (e.g., using any of a variety of generally available compilers, installation programs, compression/decompression utilities, etc.), then takes the form of executable code. In these embodiments, the computer readable storage medium 610*b* may be read by a computer readable storage media reader 610*a*.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one embodiment, local and remote computer systems (such as the computational system 600) are utilized to perform methods of the invention. According to a set of embodiments, some or all of the procedures of such methods are performed by the computational system 600 in response to the processor 602 executing one or more sequences of one or more instructions (which might be incorporated into the operating system 624 and or other code, such as an application program 622) contained in the working memory 618. Such instructions may be read into the working memory 618 from another machine-readable medium, such as one or more of the storage device(s) 608 (or 610). Merely by way of example, execution of the sequences of instructions contained in the working memory 618 might cause the processor(s) 602 to perform one or more procedures of the methods described herein.

The terms "machine readable medium" and "computer readable medium," as used herein, refer to any medium that participates in providing data that causes a machine to operate in a specific fashion. In an embodiment implemented using the computational system 600, various machine-readable media might be involved in providing instructions/code to processor(s) 602 liar execution and/or might be used to store and/or carry such instructions/code (e.g., as signals). In many implementations, a computer readable medium is a physical and/or tangible storage medium. Such a medium may take many forms, including but not limited to, volatile and non-volatile media. Non-volatile computer-readable media includes, for example, optical or magnetic disks, such as the storage device(s) (608 or 610). Volatile computer-readable media includes, without limitation, dynamic memory, such as the working memory 618. In some implementation, data may be carried, over transmission media. Transmission media includes coaxial cables, copper wire, and fiber optics, including the wires that comprise the bus 626, as well as the various components or the communication subsystem 614 (and/or the media by which the communications subsystem 614 provides communication with other devices). Hence, transmission media can also take the form of waves (including, without limitation, radio, acoustic, and/or light waves, such as those generated during radio-wave and infra-red data communications).

Common thrills of physical and/or tangible computer readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various firms of machine-readable media may be involved in carrying one or more sequences of one or more instructions to the processor(s) 602 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computational system 600. These signals, which might be in the form of electromagnetic signals, acoustic signals, optical signals, and/or the like, are all examples of carrier waves on which instructions can be encoded, in accordance with various embodiments of the invention.

The communications subsystem 614 (and/or components thereof generally will receive the signals, and the bus 626 then might carry the signals (and/or the data, instructions, etc. carried by the signals) to the working memory 618, from which the processor(s) 602 retrieves and executes the instructions. The instructions received by the working memory 618 may optionally be stored on a storage device 608 either before or after execution by the processor(s) 602.

It will be appreciated that many processing capabilities in addition to those described are possible, without departing from the teachings according to the invention. Further, it should be noted that the methods, systems, and devices discussed above are intended merely to be examples. Various embodiments may omit, substitute, or add various procedures or components as appropriate. For example, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. Further, the headings provided herein are intended merely to aid in the clarity of the descriptions of various embodiments, and should not be construed as limiting the scope of the invention or the functionality of any part of the invention. For example, certain methods or components may be implemented as part of other methods or components, even though they are described under different headings.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Those skilled in the art will understand that the embodiments describe above may be used in any combination with other embodiments described herein or in combination with devices outside of this disclosure without departing from the invention. For example, any of the cascade assembly embodiments may be employed with any of the mechanisms to translate the cascade assembly, or with the optional scoop embodiment. Alternatively, any of the cascade assembly embodiments herein may be employed with an alternative translating mechanism outside of this disclosure without departing from the invention.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g. "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What we claim is:

1. A method of process management over a computer network having multiple nodes, the method comprising:
   receiving a collaboration message at a network node of the computer network, the collaboration message having process instance data that defines a work process instance and that includes an engagement identifier (ID), a public index, a private index, a work process state, and instance parameters that define one or more source collaborators, destination collaborators, and process owner collaborators, wherein each collaborator comprises a network node, and the process instance data identifies the network node at which the collaboration message is received, wherein the process instance data is based on a template in a template repository at a network node different from the identified network node;
   verifying the instance parameters and a version number of the process instance data at the identified network node and obtaining corrected data from a work process engine at a network node different from the identified network node, in response to determining that any one of the instance parameters or version number cannot be verified, such that the instance parameters and version number are verified to be correct;
   storing the process instance data and verified instance parameters and version number at the identified network node;
   updating the work process state in response to process instance data that indicates the collaboration message was received from a defined source collaborator or destination collaborator and indicates the work process state has been changed;
   generating a generated collaboration message at the identified network node, the generated collaboration message having process instance data that indicates a work activity specified in the instance parameters has been performed and changing the work process state accordingly;
   sending the generated collaboration message from the identified network node to the source collaborators, destination collaborators, and process owner collaborators of the defined work process instance;
   changing at least one of the process instance data comprising engagement ID, public index, or private index in response to data in the received collaboration message;
   verifying that the collaboration message was received from a defined source collaborator or destination collaborator of the work process; and
   storing the verified changed process instance data at the identified network node.

2. The method as in claim 1, wherein generating the generated collaboration message is performed by an activity handler application installed at the identified network node.

3. The method as in claim 1, wherein the received collaboration message was generated at the work process engine of the computer network in response to selection of a work process template and work process parameters based on the selected work process template.

4. The method as in claim 3, wherein the work process engine further determines the process instance data of the work process instance, the process instance data including the engagement ID, public index, private index, work process state, and instance parameters that define one or more source collaborators, destination collaborators, and process owner collaborators.

5. The method as in claim 3, wherein the received collaboration message was received at the identified network node from the work process engine.

6. A computer system for process management over a computer network, the computer system comprising a node of the computer network and including:
   a memory storing program instructions and in communication with a computer processor executing the program instructions to provide a network communications block adapted for communications by the computer system network node with multiple nodes of the computer network;

the computer processor configured to execute the program instructions to perform operations comprising:

receiving a collaboration message at the computer system network node, the collaboration message having process instance data that defines a work process instance and that includes an engagement identifier (ID), a public index, a private index, a work process state, and instance parameters that define one or more source collaborators, destination collaborators, and process owner collaborators, wherein the collaborators comprise network nodes of the computer network, and the process instance data identifies the network node at which the collaboration message is received, wherein the process instance data is based on a template in a template repository at a network node different from the identified network node;

verifying the instance parameters and a version number of the process instance data at the identified network node and obtaining corrected data from a work process engine at a network node different from the identified network node, in response to determining that any one of the instance parameters or version number cannot be verified, such that the instance parameters and version number are verified to be correct;

storing the process instance data and verified instance parameters and version number at the computer system identified network node;

updating the work process state in response to process instance data that indicates the collaboration message was received from a defined source collaborator or destination collaborator and indicates the work process state has been changed;

generating a generated collaboration message at the computer system identified network node, the generated collaboration message having process instance data that indicates a work activity specified in the instance parameters has been performed and changing the work process state accordingly;

sending the generated collaboration message from the computer system identified network node to the source collaborators, destination collaborators, and process owner collaborators of the defined work process instance;

wherein the computer processor is further configured to perform operations comprising:

changing at least one of the process instance data comprising engagement ID, public index, or private index in response to data in the received collaboration message;

verifying that the collaboration message was received from a defined source collaborator or destination collaborator of the work process; and storing the verified changed process instance data at the identified network node.

7. The computer system as in claim 6, wherein the operation of generating the generated collaboration message is performed by an activity handler application installed at the computer system identified network node.

8. The computer system as in claim 6, wherein the received collaboration message was generated at the work process engine of the computer network in response to selection of a work process template and work process parameters based on the selected work process template.

9. The computer system as in claim 8, wherein the work process engine further determines the process instance data of the work process instance, the process instance data including the engagement ID, public index, private index, work process state, and instance parameters that define one or more source collaborators, destination collaborators, and process owner collaborators.

10. The computer system as in claim 8, wherein the received collaboration message was received at the computer system identified network node from the work process engine.

* * * * *

UNITED STATES PATENT AND TRADEMARK OFFICE
CERTIFICATE OF CORRECTION

| | | |
|---|---|---|
| PATENT NO. | : 9,542,660 B2 | Page 1 of 1 |
| APPLICATION NO. | : 13/831330 | |
| DATED | : January 10, 2017 | |
| INVENTOR(S) | : Schneider et al. | |

It is certified that error appears in the above-identified patent and that said Letters Patent is hereby corrected as shown below:

On the Title Page

At item (72):

The third named inventor is listed as "Frederick Albert".

The correct spelling of the inventor is "Fred Allen Albert".

Signed and Sealed this
Twenty-fifth Day of April, 2017

Michelle K. Lee
*Director of the United States Patent and Trademark Office*